J. M. ERVIN.
DIRIGIBLE HEADLIGHT.
APPLICATION FILED OCT. 8, 1915. RENEWED JUNE 17, 1916.
1,213,765.
Patented Jan. 23, 1917.
2 SHEETS—SHEET 1.
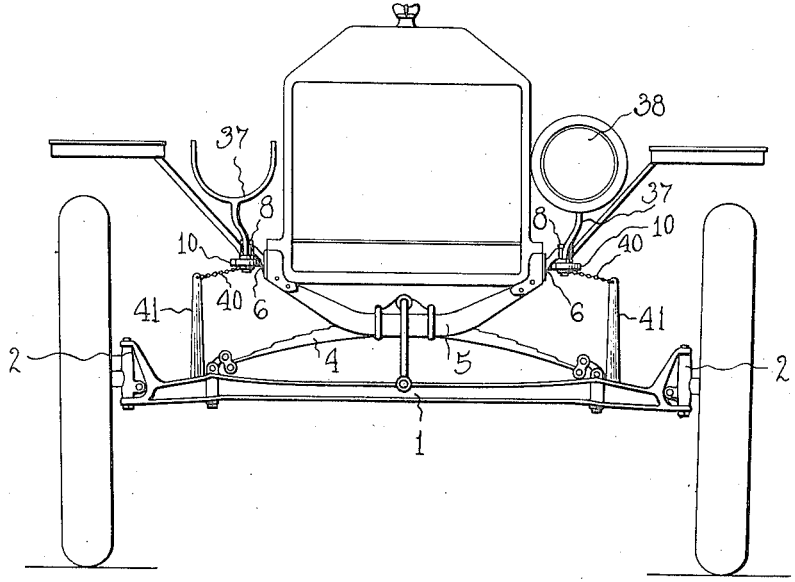
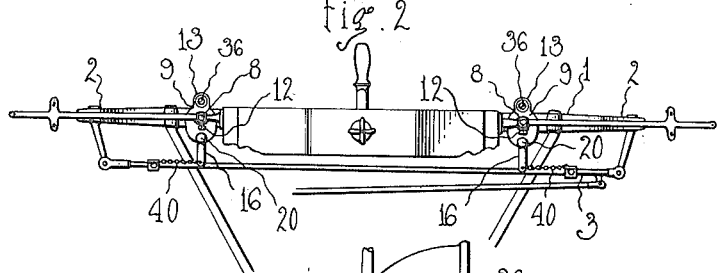
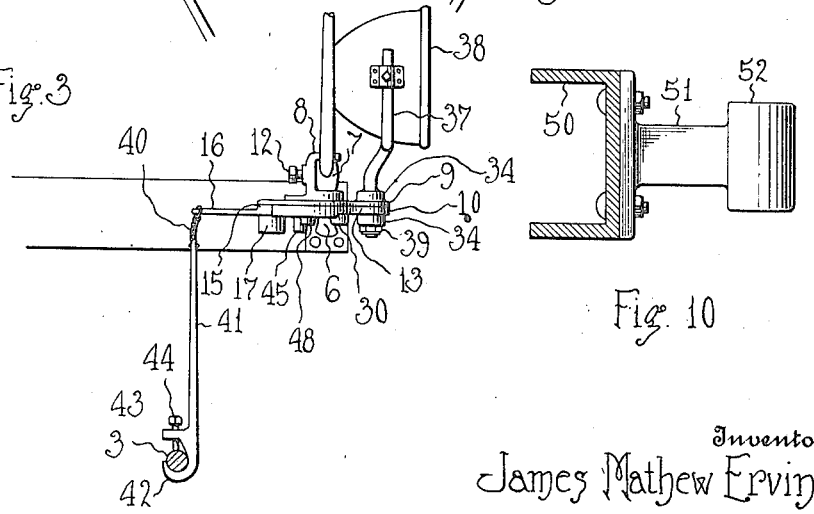
Witnesses
Karl H. Butler
Arthur F. Draper
Inventor
James Mathew Ervin
By
Attorneys

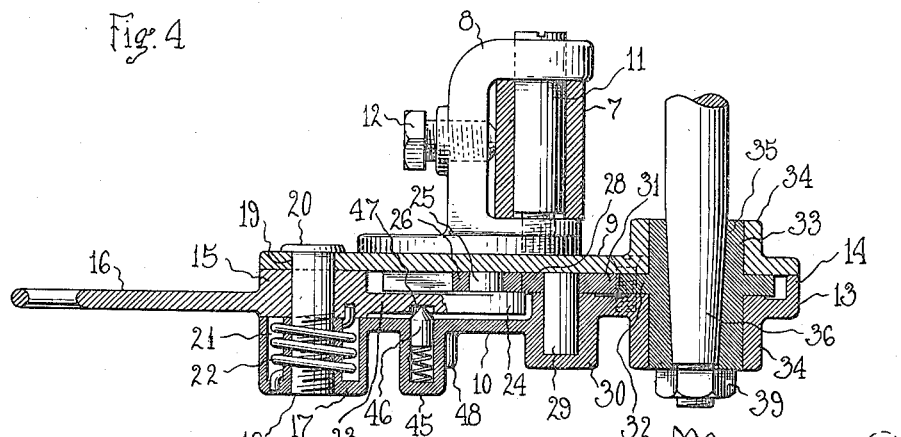
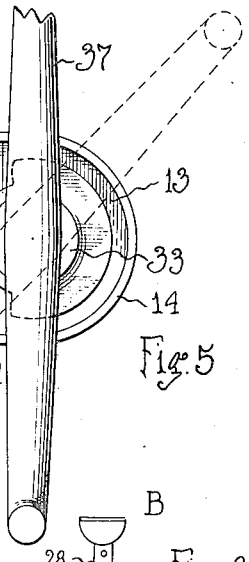
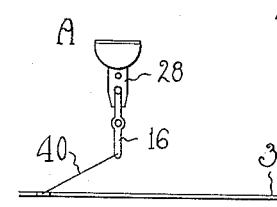
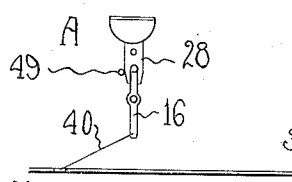
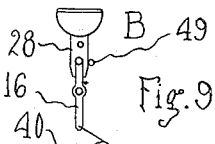
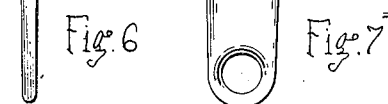

UNITED STATES PATENT OFFICE.

JAMES MATHEW ERVIN, OF ONAWAY, MICHIGAN.

DIRIGIBLE HEADLIGHT.

1,213,765.              Specification of Letters Patent.     Patented Jan. 23, 1917.

Application filed October 8, 1915, Serial No. 54,713. Renewed June 17, 1916. Serial No. 104,237.

*To all whom it may concern:*

Be it known that I, JAMES MATHEW ERVIN, a citizen of the United States of America, residing at Onaway, in the county of Presque Isle and State of Michigan, have invented certain new and useful Improvements in Dirigible Headlights, of which the following is a specification, reference being had therein to the accompanying drawings.

This invention relates to automobile head-lights, and more particularly to that class of head-lights which are pivoted or swiveled and adapted to be shifted, individually or collectively, by the steering mechanism of an automobile, and automatic means released by said mechanism, whereby rays of light are cast on to the path to be traveled by the automobile, such lamps facilitating the operation of an automobile at night, especially upon a sinuous road and at the intersection of streets.

My invention aims to provide simple and effective means, in a manner as hereinafter set forth, for simultaneously or individually shifting the lamps, lanterns, or headlights, of the well known type of "Ford" automobile, although my invention is applicable to other types of automobile by slight modifications in the mounting of the head-lights or the connections with the steering mechanism.

My invention further aims to provide a head-light turning mechanism for automobiles which may be installed to permit of one head-light being actuated by steering mechanism in a desired direction while the other headlight remains stationary or vice versa, or the mechanism may be installed whereby the headlights will be simultaneously turned in the same direction. In either instance, the mechanism includes means for normally maintaining the head-lights straight ahead, and also means for preventing vibrations of an automobile from accidentally shifting the head-lights from the straight ahead position.

My invention further aims to provide dirigible head-lights wherein the parts are constructed with a view of reducing the cost of manufacture and at the same time retain the features by which safety, durability, simplicity and ease of assembling are secured, and with such ends in view, my invention resides in the novel construction, combination and arrangement of parts to be hereinafter specifically described and then claimed.

Reference will now be had to the drawings, wherein Figure 1 is a front elevation of a portion of an automobile provided with head-lights in accordance with my invention; Fig. 2 is a plan of a portion of the same automobile illustrating the shifting mechanism with the head-light removed; Fig. 3 is a side elevation of the head-light shifting mechanism; Fig. 4 is a longitudinal sectional view of one of the casings containing shifting mechanism; Fig. 5 is a plan of the same with the cover of the casing removed; Fig. 6 is an inverted view of a connecting rod member; Fig. 7 is a rear elevation of the same; Figs. 8 and 9 are diagrammatic views of head-lights and the actuating mechanism thereof, and Fig. 10 is an elevation of a modified form of bracket.

In the drawings, 1 denotes the front axle of an automobile as having steering wheel knuckles 2 connected by a rod 3 adapted to be shifted in the ordinary and well known manner by the steering mechanism of the automobile. The front axle 1 has a spring 4 supporting a front end bearing 5 provided with the usual head-light or lamp brackets 6, and I use the same brackets for supporting the head-light shifting mechanism.

In Fig. 4, 7 denotes the barrel of one of the brackets 6 and engaging the ends of said barrel are the apertured ends of a yoke 8 carried by the cover 9 of a casing 10. The ends of the yoke 8 are retained in engagement with the barrel 7 by a pin 11 extending through the barrel and tapped into the barrel 9.

To prevent the yoke 8 from swinging in a horizontal plane relative to the barrel 7 of the bracket 6, said yoke has a set screw 12 which can be tightened against the barrel 7 to correctly position the casing 10 and its cover relative to said bracket. The casing 10 is somewhat oval in plan and has a forward semi-circular extension 13, which with the body of the casing has an upstanding flange or wall 14 upon which the cover 9 is placed, said upstanding flange or wall being cut away at the rear end of the casing to provide clearance for the apertured boss 15 of an operating lever 16. This lever is disposed in a horizontal plane between the cover 9 and the bottom of the casing 10, with the apertured boss 15 over a depending enlargement 17 carried by the bottom of the casing. The depending enlargement 17 is formed with an opening 18 having the walls thereof screwthreaded, said opening vertically alining with the aperture of the boss 15 and with an opening 19 in the cover 9, whereby a pin 20 can be mounted in the enlargement 17 to pivotally hold the operating lever 16 and permit of its oscillation. The enlargement 17 is also formed with an annular recess 21 for a coiled retractile spring 22 having one end thereof anchored in the bottom of the boss 15 and the opposite end thereof anchored in the bottom of the annular recess 21.

The boss 15 of the operating lever 16 is formed with a sector shaped web 23 having an extension 24 in alinement with the operating lever 16, and said extension is provided with a vertically disposed pin 25 for an anti-frictional roller 26. The roller 26 is located within the slot or bifurcation 27 of a crank 28 loosely mounted upon the upper end of a pin 29 seated in another enlargement 30 forming part of the bottom of the casing 10, and by reference to Fig. 4, it will be noted that the bottom of the casing is shaped to afford a bearing and support for the crank and permit of the bifurcated or slotted end thereof being superposed relative to web 23 and the extension thereof.

The crank 28 is formed with a segment rack 31 meshing with a toothed portion 32 of a socket member 33, journaled in vertically alining bearings 34 forming part of the casing 10 and the cover 9 thereof. The socket member 33 is provided with a tapering or conical socket 35 for the lower tapering end or stem 36 of a head-light or lantern bracket 37, said bracket being of the conventional form employed for supporting a head-light or lantern 38. The bracket 37 is fixed relative to the socket member 33, by a nut 39 or similar fastening means mounted upon the lower end or stem of the bracket.

The operating lever 16 is connected by a chain 40 or other flexible connection to the upper end of a connecting rod member 41 mounted in an upright position on the connecting rod 3 of the steering mechanism of the automobile. The manner of connecting the member to said rod is best shown in Fig. 6, where it will be observed that said member has a hook shaped member 42 embracing a portion of the rod, a lug 43, and a set screw 44 in said lug engaging the connecting rod 3 and coöperating with the hook shaped end 42 of the member in clamping said member in an upright position upon the connecting rod.

Before describing the operation of the mechanism by aid of Figs. 8 and 9, I desire to call attention to the springs 22. These springs are always under tension to move the operating levers 16 in one direction or the other and the flexible connections 40 are always taut. One connection may place a spring under greater tension while the other connection releases the tension of another spring or vice versa.

Assuming that the automobile is steered to the left by moving the steering rod 3, and observing such movement in connection with Figs. 2 and 8, then the mechanism of the head-light generally designated B at the right hand side of the automobile is actuated by reason of the chain or flexible connection 20 shifting the operating lever 16, and the mechanism of the head-light generally designated A at the left hand side of the automobile is actuated by reason of the chain or flexible connection 20 becoming slack, figuratively speaking, allowing the spring 22 to shift the headlight A in the same direction as headlight B. When the operating lever 16 of the mechanism of head-light B is shifted in a lateral plane, the anti-frictional roller 26 riding in the bifurcation or slot 27 in the crank 28 turns said crank upon the pivot pin 29 and a rotary movement is imparted to the socket member 33 sufficient to turn the head-light bracket 37 in a direction that would cause the headlight B to cast rays of light to the right and on the path of the automobile.

When moving the operating lever 16, the spring 22 is placed under additional tension and restores the operating lever 16 to normal position, as the automobile assumes a straight line of travel or approximately so.

During the direct operation of the headlight B by the steering mechanism, the head-light A is actuated by the tension of the spring 22, which is released by the flexible connection 20, and said headlight is restored to normal position by the connection again placing the spring under its normal tension.

To prevent the operating lever 16 from vibrating during the operation of an automobile, and to temporarily hold said lever in a shifted position, the bottom of the casing 10 is provided with another enlargement 45 housing a spring pressed detent 46 adapted to engage in notches 47 in the bottom side of the sector shaped web 23 of the operating lever, a notch being adjacent each end of the web and intermediate the ends thereof, whereby the detent can hold the operating lever in normal position or when shifted to the right or left.

The bottom of the casing 10 is provided with additional enlargements 48 to accommodate a stop pin 49 employed for limiting the movement of the crank 28 when it is desired to hold a head-light in a straight ahead position, while another head-light is moved. For instance with pins 49 in the positions shown in Fig. 9, the springs 22 through the medium of the webs 23 hold the cranks 28 against the pins, thus preventing the cranks 28 from swinging in certain directions. The crank 28, of head-light B is free to swing to the left when the light is swung to the right, but as the crank 28 of the head-light A is held by the pin 49 against such movement by the released spring, then the head-light remains in a straight ahead position. In the same manner the head-light A can be swung to the left while the head-light B is held inactive. The advantage gained by this arrangement is apparent at the intersection of streets since the straight ahead light will show as a signal while the other light seeks the lane of travel into which the automobile is turning.

As herein described and illustrated, the head-light mechanism has been designed for the permanent brackets of Ford automobiles, but should it be desired to use the head-light mechanism in connection with other types of automobiles, then a side frame or suitable support 50, as shown in Fig. 10 can be provided with a bracket 51 having a barrel 52 similar to the barrel 7 of the bracket 6.

What I claim is:—

1. The combination with a rotatable headlight, of a crank for moving said headlight, a lever adapted to move said crank, a spring adapted to move said lever in one direction, means for moving said lever in an opposite direction against the action of said spring whereby said spring restores said lever to normal position, and means engaging said lever to hold said lever, said crank and said headlights in normal position.

2. The combination with a rotatable headlight, of a crank for moving said headlight, a lever adapted to move said crank, a spring held under tension by said lever and adapted to move said lever in one direction, means connected to said lever holding said lever against the action of said spring and adapted to move said lever in an opposite direction to that of said spring and thereby place said spring under additional tension whereby said spring restores said lever to normal position and remains under sufficient tension to move said lever in an opposite direction to that of said means.

3. The combination with a rotatable headlight, of a crank for moving said headlight, a lever having a rolling action against said crank adapted to move said crank, a spring held under tension by said lever and adapted to move said lever in one direction, means for moving said lever in an opposite direction against the action of the spring whereby said spring restores said lever to normal position, means engaging said lever to hold said lever, said crank, said headlight in normal position, and means adapted for mounting against said crank whereby said crank can only be moved in one direction.

4. The combination with a headlight, of a casing, a socket member in said casing supporting said headlight, a crank in said casing for moving said socket member, a lever extending into said casing for moving said crank, and means adapted to be mounted in said casing to limit the movement of said crank in one direction.

5. The combination with a vehicle having headlight brackets, and a steering mechanism, of casings supported by said brackets, rotatable socket members having toothed portions in said casings, headlights supported by said members, cranks in said casings having segment racks engaging the toothed portions of said members for moving said members, operating levers extending into said casings and having a rolling action against said cranks for moving said cranks, connections between each lever and said steering mechanism adapted to move either lever to turn a headlight, and means associated with each operating lever to automatically move the lever not actuated by the steering mechanism to turn the headlight thereof in the same direction as the headlight actuated by the steering mechanism.

In testimony whereof I affix my signature in presence of two witnesses.

JAMES MATHEW ERVIN.

Witnesses:
A. W. WILCOX,
J. R. SNODY.